United States Patent [19]

Craig

[11] Patent Number: 4,521,104

[45] Date of Patent: Jun. 4, 1985

[54] APPARATUS AND METHOD FOR PRODUCING PHOTOGRAPHIC RECORDS OF TRANSPARENCIES

[76] Inventor: Dwin R. Craig, 9447 Emory Grove Rd., Gaithersburg, Md. 20877

[21] Appl. No.: 555,973

[22] Filed: Nov. 29, 1983

[51] Int. Cl.³ .................. G03B 27/72; G03B 27/80
[52] U.S. Cl. ............................... 355/20; 355/68; 354/76
[58] Field of Search .............. 355/20, 81, 84, 68; 358/244; 346/110 R; 354/76

[56] References Cited

U.S. PATENT DOCUMENTS

| | | | |
|---|---|---|---|
| 3,183,766 | 5/1965 | Takasaka et al. | 355/20 |
| 3,472,952 | 10/1969 | Alway | 355/68 |
| 4,265,532 | 5/1981 | McIntosh | 355/20 |

Primary Examiner—L. T. Hix
Assistant Examiner—Della Rutledge

Attorney, Agent, or Firm—Willian Brinks Olds Hofer Gilson & Lione

[57] ABSTRACT

An apparatus and method for producing photographic records of transparencies comprising a standard television monitor including a cathode ray tube having a raster and operable to generate a flying spot of light on the raster at a standard television sweep rate. The apparatus includes and the method uses a standard camera and a support for supporting the transparency between the raster and camera. Light from the flying spot passes through the transparency and is monitored by a photoelectric detector in advance of light passing through the same transparency areas being viewed by the camera lens. The photoelectric detector is connected by an inverse electronic feedback to the input of the cathode ray tube to vary the intensity of the flying spot inversely to the intensity of the light sensed by the detector. This produces a negative luminous image on the raster. The camera lens views an image which is a composite of the transparency and raster images and which has a compressed brightness range.

11 Claims, 3 Drawing Figures

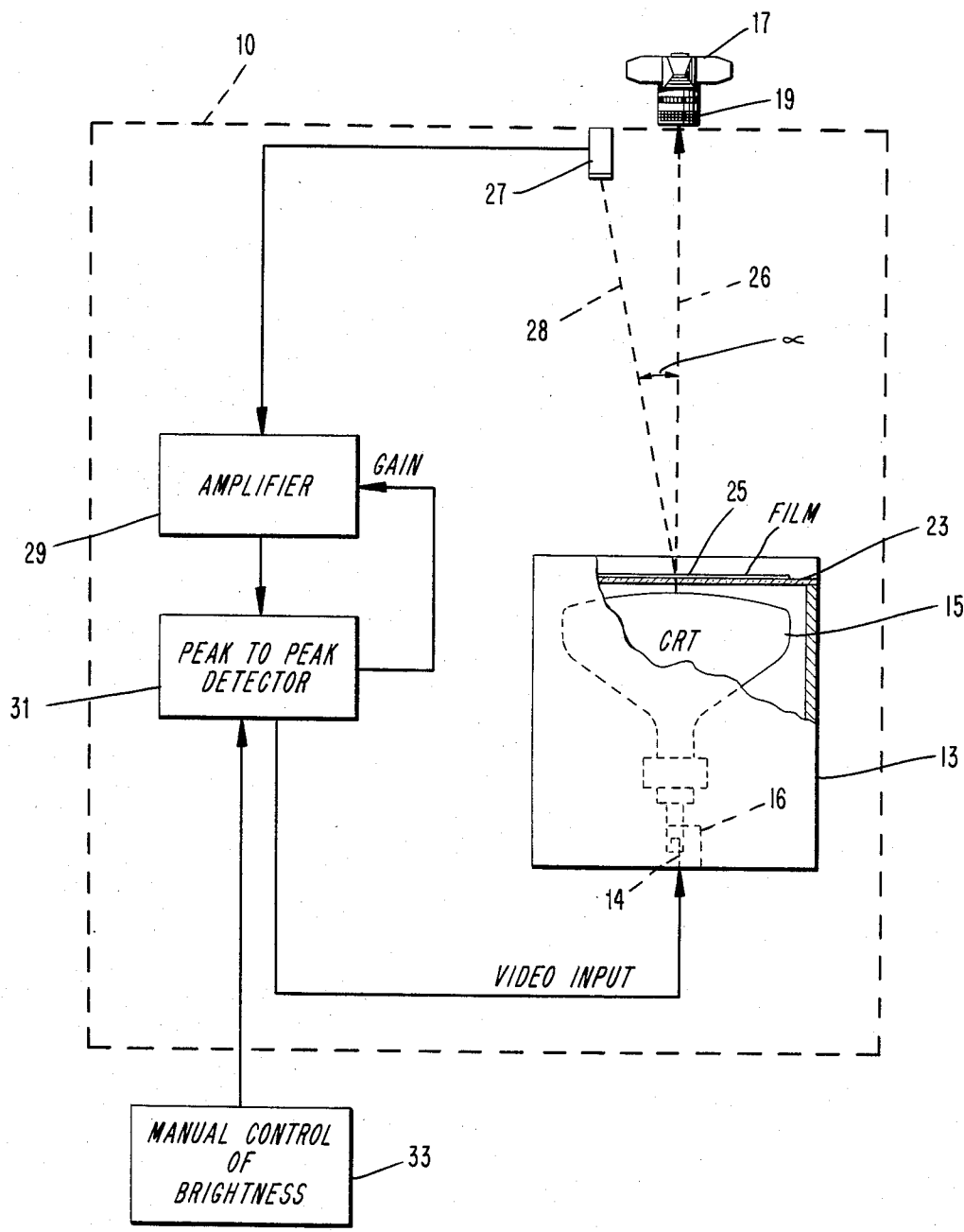

APPARATUS AND METHOD FOR PRODUCING PHOTOGRAPHIC RECORDS OF TRANSPARENCIES

BACKGROUND OF THE INVENTION

This invention relates generally to photographic-reproductive apparatus and methods, and more particularly to an apparatus for producing photographic records of transparencies. The present invention finds particular use in producing photographic records of radiographs, i.e., X-ray films and the like wherein the brightness range of the transparency exceeds that of standard copy materials.

It is important to be able to produce photographic records of images on transparencies such as X-ray films for publication, slide presentations, etc. Such records are produced by photographing the transparency while it is illuminated, and then processing the camera film in appropriate fashion.

A problem arising in the production of such photographic records is that the brightness range of transparencies, i.e., the light transmission range from the darkest to the lightest areas of the transparency image, often exceeds that of standard copy materials, i.e., photographic paper, sometimes by as much as five times or more. When copy materials are chosen to accommodate the entire brightness range of the transparency image, details of the image suffer a loss of contrast and a great deal of information is lost in the photographic record. On the other hand, when copy materials are chosen to preserve detail contrast at midscale of the transparency light transmission range where contrast is the highest, the relatively large brightness range of the transparency image exceeds the acceptance range of the copy material so that a great deal of detail is lost in either the bright areas or the dark areas.

To overcome these drawbacks, attempts have been made to modify or alter the intensity of the illuminating light source to preserve detail and contrast in photographic records of transparencies. Thus, such apparatus utilizing cathode ray tubes (CRT) as the illuminating source vary or modulate the intensity of light generated by the CRT beam, or modulate the velocity of the beam, or both, to reduce the overall contrast of the transparency image so that it can be reproduced on standard copy materials with all detail intact. Others which utilize intensity modulation, while often producing satisfactory results, are somewhat expensive and are slow in operation. Those utilizing velocity modulation or a combination of velocity and intensity modulation are significantly more expensive and combersome.

SUMMARY OF THE INVENTION

The present invention overcomes the problems and disadvantages of the prior art by providing an electronic mask which is operable to compress the image brightness range presented to a standard camera so that it matches the acceptance range of standard copy materials. The apparatus and method utilize a standard television monitor which includes a CRT operable to generate a flying spot of light at a standard television sweep rate to illuminate the transparency. A photoelectric detector continuously monitors light from the flying spot passing through the transparency and is connected by an inverse electronic feedback means to the CRT input to vary the intensity of the light spot inversely to the brightness sensed. The photoelectric detector is positioned relative to the camera so that a negative luminous image of the transparency image is produced on the CRT raster. The transparency image and the negative luminous image produce a composite image which has a compressed brightness range relative to the brightness range of the transparency image and which can be photographed by a standard camera. Photographic records can be made using copy material chosen to preserve detail at midscale so that all detail is reproduced as if it were at midscale where contrast is highest and information content is the greatest.

Additional objects and advantages of the invention will be set forth in part in the description which follows, and in part will be obvious from the description, or may be learned by practice of the invention. The objects and advantages of the invention may be realized and attained by means of instrumentalities and combinations particularly pointed out in the appended claims.

To achieve the objects and in accordance with the purpose of the invention, as embodied and broadly described herein, the apparatus for producing photographic records of transparency images comprises a television monitor including a cathode ray tube having a raster and operable to generate a flying spot of light on the raster at a standard television sweep rate, a camera having a lens positioned to view the raster, means for supporting the transparency between the raster and the camera lens whereby the lens views light from the flying spot passing through the transparency, a photoelectric detector operable to continuously monitor light from the flying spot passing through the transparency, the photoelectric detector being positioned relative to the lens to monitor light passing through each area of the transparency before light passing through the same areas of the transparency is viewed by the camera lens, inverse electronic feedback means interconnecting the photoelectric detector and the cathode ray tube and operable to vary the intensity of the light spot inversely to the brightness of light monitored by the photoelectric detector, the camera lens and the photoelectric detector being positioned relative to one another, and the feedback means being constructed to produce a negative luminous image of the transparency image on the raster, the transparency image and the negative luminous image producing a composite image having a compressed brightness range relative to the brightness range of the transparency image and operable for viewing by the camera lens.

The apparatus is incorporated in a housing which provides a convenient console arrangement. The housing is constructed of a material or materials which are substantially impermeable to light so that the apparatus can be used under normal lighting conditions and is not restricted to darkroom use.

Importantly, the apparatus uses a standard television monitor as the illuminating source, and any one of a variety of standard cameras so that the apparatus is not only inexpensive but is very versatile.

Further, the apparatus includes a manual control which allows use with a variety of transparency brightness ranges.

In another aspect, the invention includes the method of producing photographic prints of transparency images comprising the steps of illuminating a transparency using a flying spot of light on a raster of a cathode ray tube at a standard television sweep rate, monitoring the light passing through said transparency by a photoelectric detector, generating a signal in response to the intensity of light monitored by said detector, and using the signal to vary the intensity of said light spot, whereby to produce a negative luminous image of the transparency image on the raster.

Broadly, the method further includes the step of photographing an image which is the composite of the transparency and negative luminous images.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 3 is a diagrammatic representation of a photographic print producing apparatus embodying the present invention.

DETAILED DESCRIPTION OF THE PREFERRED EMBODIMENT

Reference will now be made in detail to the present preferred embodiment of the invention, an example of which is illustrated in the accompanying drawings.

Figure 1:
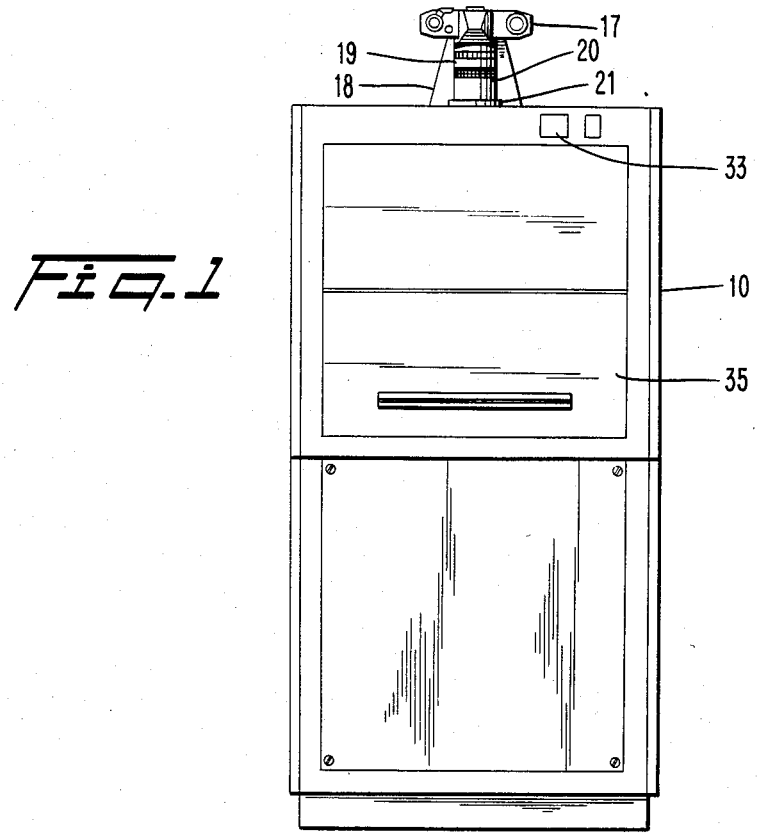
FIG. 1 is a front elevational view of a console embodying the invention.
Figure 2:
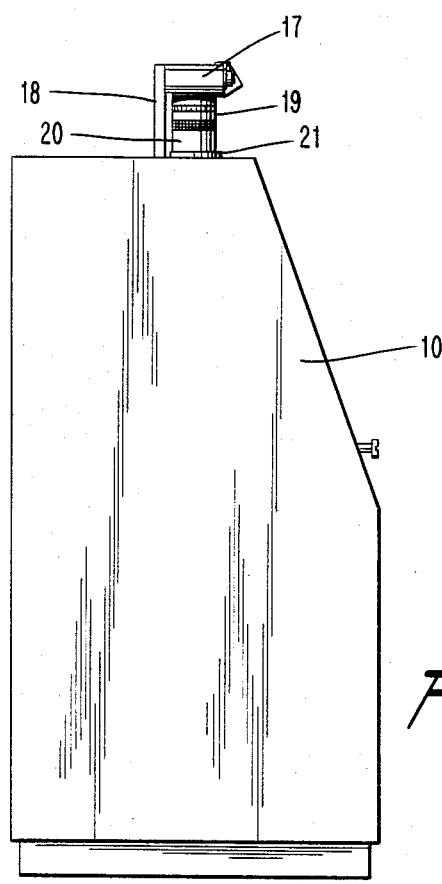
FIG. 2 is a side elevational view of FIG. 1.

The preferred embodiment of photographic print producing apparatus is shown in FIGS. 1-3. This apparatus comprises a television monitor including a cathode ray tube (CRT) operable to generate a flying spot of light on a raster at a standard television sweep rate. As embodied herein, a housing 10 is provided which is constructed of opaque material substantially impermeable to light, i.e., a "black box." A standard television monitor 13 is supported in the lower portion of the housing 10 and includes a CRT 11 having a raster 15, a cathode 14, and a control grid 16 (FIG. 3) and is adapted to be connected to a suitable electric power supply as will be understood by those skilled in the art.

As further embodied herein, the CRT 11 is operable, when energized, to generate a flying spot of light on the raster 15 at a standard television sweep rate. As is conventional in the United States, the flying light spot traverses the raster 15,000 times per second from right-to-left as seen in FIG. 3 shifting vertically downwardly after each horizontal sweep. Vertical travel down the entire face 15 takes about 1/60 of a second. Conventionally, successive horizontal sweeps of the flying spot of light are spaced vertically from one another and the next sequence of horizontal sweeps of the light beam interlace the first set of sweeps.

In accordance with the invention, a camera is provided having a lens positioned to view the raster, and means is provided for supporting the transparency between the raster and the camera lens whereby the lens views light from the flying spot passing through the transparency. As embodied herein, a camera 17 is supported at the top of the housing 10 and includes a lens 19 which is positioned to view the raster 15. Suitable means such as a bracket 18 is provided to removably secure the camera 17 in place on the housing 10. The camera lens 19 engages a cylindrical tube 20 which extends toward an opening 22 in the top of the housing 10, the latter defining a viewing port. The tube 20 is constructed and adapted to engage the camera structure around lens 19 so that no light enters the housing 10. A positive lens 21 is positioned in the opening 22 and permits the lens 19 to admit light from the flying spot of light as it sweeps the entire CRT raster 15 so that the image of the transparency is focussed in the plane of the film in the camera.

As further embodied herein, a support 23 is provided to support a transparency 25 between the CRT raster 15 and the camera lens 19. The support 23 may be the transparent screen of the monitor 13 and is adapted to permit free passage of light therethrough. The transparency 25 may be, for example, a radiograph or X-ray film or other transparency and is provided with an image thereon. The transparency 25 includes light and dark areas which define the image.

It is desirable to be able to produce photographic records, e.g., prints of the transparency 25 for publication, slides for lecture presentations, etc. Importantly, the photographic record should reproduce all detail appearing in the transparency image at sufficient contrast so that the information content of the print is maximized.

As described above, the brightness range of transparencies of the type referred to herein, i.e., the light transmission range from the darkest to the lightest areas, often exceeds that of standard copy materials used to make photographic record, sometimes by as much as five times or more. In those photographic reproducing apparatus which in the past compromise by selection of copy materials chosen to accommodate the entire transparency brightness range or by selection of copy materials which preserve detail contrast at midscale, a large amount of detail (and information) is lost. Those devices which in the past have altered or modulated the intensity or velocity of the illuminating light beam are relatively slow or cumbersome and expensive, or both.

In accordance with the present invention, a photoelectric detector is provided which is operable to continuously monitor light from the flying spot passing through the transparency. The photoelectric detector is positioned relative to the camera lens to monitor light from the spot passing through each area of the transparency before light from the spot passing through the same area of the transparency is viewed by the camera.

As embodied herein, a photoelectric detector 27 is provided in the housing 10 adjacent the camera 17 and monitors light from the flying spot passing through the transparency 25. The detector 27 is positioned to the side of the camera in the direction of horizontal sweep of the flying spot of light. As seen in FIG. 3, the flying spot of lght travels from right to left across the CRT raster 15 and the photoelectric detector 27 is positioned to the left of the camera 17. Thus, the photoelectric detector 27 is affected by light from the flying spot passing through the transparency 25 at an area or zone of the transparency 25 before the camera 17 sees light passing through that same area. Stated another way, the area of the transparency 25 through which light passes to the photoelectric detector 27 is upstream in the scanning direction of the light spot of the area of the transparency through which light passes and is viewed by the camera 17. This is true for all positions of the flying spot so that the photoelectric detector 27 monitors the light beam from the spot passing through a selected area of the transparency before a light beam from the spot passing through the same area is viewed by the camera.

This can best be understood by reference to FIG. 3. A light beam from the flying spot passing through an area of the film 25 on the optical axis of the camera lens 19 is shown at 26. A light beam passing through the same transparency area and sensed by the detector 27 is shown at 28. The light beams 26, 28 form an angle α. Because the detector 27 views upstream of the camera lens 19 in the sweep direction of the light spot, the detector 27 monitors light passing through an area of the transparency before the camera lens views light passing through that same area.

In accordance with the invention, inverse electronic feedback means interconnects the photoelectric detector and the cathode ray tube and is operable to vary the intensity of the flying spot of light inversely to the brightness of light monitored by the photoelectric detector. As embodied herein, an amplifier 29 is connected to the photoelectric detector 27 and receives from the detector a signal which is a function of the intensity of light sensed by the detector. The signal from the detector 27 is amplified by the amplifier 29 and is fed to the CRT 11 to control the grid 16 or cathode 14 and modulate the brightness or intensity of the flying spot of light in response to the intensity of light monitored by the detector. As the light monitored by the detector 27 becomes brighter, the intensity of the flying light spot decreases and vice versa.

A peak-to-peak detector 31 is provided with a manual control 33 and is connected to the amplifier 29. The peak-to-peak detector sets the gain of the amplifier to the selected brightness range chosen by way of the manual control 33.

In accordance with the invention, the camera lens and the photoelectric detector are positioned relative to one another, and the feedback means is constructed to produce a negative luminous image of the transparency image on the raster of the cathode ray tube. The transparency image and the negative luminous image produce a composite image which has a compressed brightness range relative to the brightness range of the transparency image and operable for viewing by the camera lens.

As embodied herein, and described above, the camera 19 and the photoelectric detector 27 are positioned relative to one another so that the photoelectric detector is affected by light passing through an area of the transparency 25 prior to the time that the camera 17 views light passing through that same area. A signal which is a function of the brightness intensity of light passing through that preselected area of the transparency 25 and monitored by the detector 27 is amplified by the amplifier 29 and controls the video input to the CRT 11 and the resulting intensity of the light spot. The position of the photoelectric detector 27 relative to the camera 17, i.e., angle α, is related to the sweep rate of the flying spot and the known signal delay in the feedback loop to compensate for this delay. Thus, if the signal delay of the electronic feedback loop is one microsecond, then the photoelectric detector 27 is positioned relative to the camera 17 to sense the intensity of light from the flying spot of light passing through an area on the transparency 25 one microsecond prior to the time that the camera 17 views light passing through that same area. The sequence continues for the rapidly sweeping light spot so that it continuously gets brighter when the detector 27 senses dark areas and gets darker when the detector senses bright areas until eventually a steady state condition is reached. At this point an image produced on the raster 15 by the light spot is the negative of the image on the transparency and is aligned therewith.

It will be appreciated that the negative luminous image on the raster 15 is immediately behind the image on the transparency 25 so that the image viewed by the camera lens 19 is a composite of the image on the transparency 25 and the image on the CRT raster 15. Because of this, the composite image viewed by the camera 17 has a brightness range which is compressed relative to the brightness range of the transparency image. By properly selecting the brightness range of the peak-to-peak detector 11 through the control 33, the brightness range of the composite image which is presented to the camera 17 can be selected to match the acceptance range of standard copy materials. Thus, copy materials can be chosen to preserve detail at midscale so that all detail in both the light and dark areas of the transparency image are preserved and are reproduced at midscale where contrast is highest and information content is the greatest.

The operation of the apparatus of the present invention will be understood by those skilled in the art. Summarizing, a transparency 25 having an image thereon is placed on the support 23 after a door 35 at the front of the housing 10 is opened. The flying spot of light from the CRT 11 sweeps across the raster 15 generating a beam which passes through the transparency 25. The photoelectric detector 27 senses the intensity of light from the spot passing through each area of the transparency 26 prior to the time that the camera sees light passing through the same area and produces a signal which varies the intensity of the light spot inversely to the intensity of the light sensed. This produces a negative luminous image of the transparency image on the raster 15 and the camera 17 sees an image which is a composite of the transparency image and the negative luminous image having a compressed brightness range. The camera is then actuated and produces a record of the composite image. A photographic reproduction can be made using standard copy materials preserving all detail of the transparency image at both light and dark areas.

By the present invention, there is provided an improved apparatus and method calculated to fulfill the inventive objects set out herein. The apparatus and method make use of a standard television monitor and a standard camera so that it is relatively low in cost and yet produces images which can be recorded on standard copy materials. Transparencies having widely different brightness ranges can be copied to produce records having high contrast and maximum information content. The apparatus is constructed in convenient console form and includes a housing which is substantially impermeable to light so that it can be used in normal lighting conditions.

It will be understood by those skilled in the art that various additions, substitutions, modifications and omissions can be made to the apparatus of the present invention without departing from the scope or spirit of the invention. For example, the present invention is intended to encompass both black and white and color photographic materials used in conjunction with appropriate television monitors. Thus, it is intended that the present invention cover the additions, substitutions, modifications and omissions provided they come within the scope of the appended claims and their equivalents.

What is claimed is:

1. Apparatus for producing photographic prints of transparency images comprising a standard television monitor including a cathode ray tube having a raster and operable to generate a flying spot of light on the raster at a standard television sweep rate, a camera having a lens positioned to view the raster, means for supporting said transparency between said raster and said camera lens whereby said lens views light from said flying spot passing through said transparency, a photoelectric detector operable to continuously monitor light from said flying spot passing through said transparency, said photoelectric detector being positioned relative to said lens to monitor light passing through each area of said transparency before light passing through the same areas of said transparency is viewed by said camera lens, inverse electronic feedback means interconnecting said photoelectric detector and said cathode ray tube and operable to vary the intensity of said light spot inversely to the brightness of light monitored by said photoelectric detector, said camera lens and said photoelectric detector being positioned relative to one another, and said feedback means being constructed to produce a negative luminous image of said transparency image on said raster, said transparency image and said negative luminous image producing a composite image having a compressed brightness range relative to the brightness range of said transparency image and operable for viewing by the camera lens.

2. The apparatus claimed in claim 1, including a housing constructed of substantially opaque material enclosing said television monitor and said transparency support means.

3. The apparatus claimed in claim 2, including means for mounting said camera on the outside of said housing, means forming a viewing port through said housing and operable to align with said camera lens.

4. The apparatus claimed in claim 3, said camera mounting means being operable for removal of said camera.

5. The apparatus claimed in claim 2, said housing having a door which can be opened so that a transparency can be inserted into and removed from the interior of said housing and in position on said support.

6. The apparatus claimed in claim 1, said television monitor including a transparent screen adjacent said raster and forming said transparency support.

7. The apparatus claimed in claim 1, said cathode ray tube including a cathode and a control grid, said feedback means including an amplifier adapted to receive said signal from said photoelectric detector and to vary the intensity of said light spot through said control grid.

8. The apparatus claimed in claim 7, said feedback circuit further including a peak-to-peak detector connected to said amplifier, a manual control for said peak-to-peak detector for setting the gain of the amplifier.

9. A method of producing photographic prints of transparency images comprising the steps of illuminating a transparency using a flying spot of light on a raster of a cathode ray tube of a standard television receiver at a standard television sweep rate, monitoring the light passing through said transparency by a photoelectric detector, generating a signal in response to the intensity of light monitored by said detector, and using said signal to vary the intensity of said light spot, whereby to produce a negative luminous image of said transparency image on said raster.

10. The method claimed in claim 9, further including the step of photographing an image which is the composite of said transparency and negative luminous images.

11. The method claimed in claim 9, further including the step of providing a camera having a lens positioned to view light from the flying spot, and positioning the photoelectric detector relative to the lens to monitor light passing through each area of the transparency before light passing through the same areas of the transparency is viewed by the camera lens.

* * * * *